United States Patent
Magnussen (12) 
(10) Patent No.: US 6,529,476 B1
(45) Date of Patent: Mar. 4, 2003

(54) METHOD AND A NETWORK ELEMENT FOR TRANSFERRING DATA PACKETS IN A TELETRANSMISSION NETWORK

(75) Inventor: Andreas Magnussen, Nærum (DK)

(73) Assignee: Tellabs Denmark A/S (DK)

( * ) Notice: Subject to any disclaimer, the term of this patent is extended or adjusted under 35 U.S.C. 154(b) by 0 days.

(21) Appl. No.: 09/171,318

(22) PCT Filed: Apr. 11, 1997

(86) PCT No.: PCT/DK97/00159

§ 371 (c)(1),
(2), (4) Date: May 3, 1999

(87) PCT Pub. No.: WO97/39555

PCT Pub. Date: Oct. 23, 1997

(30) Foreign Application Priority Data

Apr. 12, 1996 (DK) .............................................. 0428/96

(51) Int. Cl.[7] .............................................. H04J 15/00
(52) U.S. Cl. ........................................ 370/235; 370/414
(58) Field of Search ................................. 370/235, 236, 370/413, 414

(56) References Cited

U.S. PATENT DOCUMENTS

| | | | | |
|---|---|---|---|---|
| 5,533,009 A | * | 7/1996 | Chen ........................... | 370/17 |
| 5,790,770 A | * | 8/1998 | McClure et al. ............. | 370/388 |
| 5,978,359 A | * | 11/1999 | Caldara et al. ............. | 370/236 |
| 5,982,776 A | * | 11/1999 | Manning et al. ............. | 370/235 |
| 6,122,251 A | * | 9/2000 | Shinohara ................... | 370/231 |
| 6,134,218 A | * | 10/2000 | Holden ........................ | 370/232 |

FOREIGN PATENT DOCUMENTS

| | | | |
|---|---|---|---|
| EP | 0603916 | 6/1994 | ........... H04L/12/56 |
| EP | 0681385 | 11/1995 | ........... H04L/12/56 |
| WO | 9414266 | 6/1994 | ........... H04L/12/56 |
| WO | 9515637 | 6/1995 | ........... H04L/12/56 |

OTHER PUBLICATIONS

Masaki Umayabashi, et al., "Input and Output Queueing Packet Switch with Backpressure Mode and Queue Loss Mode for Two Classes", IEEE 1995, pp. 169–172.

Hosein F. Badran, et al., "Fairness for Broadband Integrated Switvh Architectures under Backpressure Mechanisms", IEEE 1991, pp. 1033–1037.

Hosein F. Badran, et al., "ATM Switch Architectures with Input–Output–Buffering: Effect of Input Traffic Correlation, Contention Resolution Policies, Buffer Allocation Strategies and Selay in Backpressure Signal", Computer Networks and ISDN Systems, vol. 26, No. 9, May 1994, Amsterdam, pp. 1187–1213.

* cited by examiner

Primary Examiner—Melvin Marcelo
Assistant Examiner—Derrick W Ferris
(74) Attorney, Agent, or Firm—Baker Botts L.L.P.

(57) ABSTRACT

In a method of transferring data packets between a plurality of network elements (14; 28) in a teletransmission network (1), at least some data packets are transferred at a bit rate which depends on available network capacity. When arriving at a network element, packets are positioned in a plurality of input queues (33; 37). Then, the packets are transferred from the input queues (33; 37) to at least one output queue (38) at a bit rate which is regulated by a factor ($\lambda$) which depends on the filling degree of the output queue.

14 Claims, 6 Drawing Sheets

METHOD AND A NETWORK ELEMENT FOR TRANSFERRING DATA PACKETS IN A TELETRANSMISSION NETWORK

The invention concerns a method of transferring data packets between a plurality of network elements in a teletransmission network, wherein at least some data packets are transferred at a bit rate which depends on available network capacity. The packets, when arriving at a network element, are positioned in a plurality of input queues and are then transferred to at least one output queue. The invention moreover concerns a network element for use in such a teletransmission network.

A plurality of methods is known for the transfer of data packets between a plurality of network elements in a teletransmission network. An example of such a method is ATM (Asynchronous Transfer Mode). ATM is a packet technology which transfers data packets of a fixed, short length. In the ATM the data packets are called cells, and each cell consists of 53 bytes, of which 48 are used for information transfer proper, while 5 bytes are so-called header information used for controlling the transmission.

One of the advantages of the ATM and other corresponding technologies is that network capacity is occupied only in relation to the amounts of data which are actually transferred, as the system uses so-called virtual connections which are set up by transmitting a set-up request through the network to the desired destination.

The physical network itself, in which the data packets are transmitted, may e.g. be a fibre-optical network using PDH (Plesiochronous Digital Hierarchy) or SDH (Synchronous Digital Hierarchy). Also, a variety of physical media or protocols may be included within the same infrastructure.

A virtual ATM connection passes a plurality of network elements en route in the network from source to destination. The task of an ATM network element is to determine on the basis of the header information of a received ATM cell to which network element output the cell is to be passed, and then to perform this operation while updating the header information of the cell.

As ATM cells to a specific output on an ATM network element may come from many different inputs of the exchange, it may happen that the total instantaneous rate of these cells may exceed the capacity of the output. It is known e.g. from European Patent Application EP 680 180 to solve this problem by means of large buffers or queues capable of accommodating a brief overload of cells in the network element.

As it is precisely one of the advantages of the ATM and other corresponding systems that network capacity is occupied only in relation to the amounts of data which are actually transferred, and as data are typically transferred in "bundles", the network load will vary strongly. At some times the capacity is almost utilized fully, while at other times there will be a great surplus capacity. This opens up the possibility of offering a service called ABR (Available Bit Rate) which may be used for data insensitive to delays. These data are then transferred only in case of available capacity. If the capacity is suddenly occupied by data of higher priority (non-ABR data), the transmission is suspended or limited until there is available capacity again.

European Patent Application EP 678 997 discloses an ATM system capable of also handling ABR. A network element in this system has an input and an output module for each line in the network connected to the network element. The input modules include special storages or buffers which are specially intended for ABR traffic, a buffer or queue being provided for each output module. The system allocates capacity to these buffers only when all other traffic has been handled, and the transmission is interrupted again if the capacity is again needed for traffic of higher priority. When an input module has ABR traffic to an output module, an ABR request is transmitted to the output module, where it is registered in a resource allocator. When the output module has available capacity, the resource allocator transmits a signal to the input module concerned, and the ABR traffic is then transferred to the output module and further on the associated line in the network.

Although this solution is capable of handling ABR traffic in an ATM system, the internal communications in the network element are rather complex and thus expensive to implement. Further, as a result of inexpedient internal regulation of the ABR traffic, the buffers or queues used must be very long to avoid data losses, since arriving ABR cells are to be stored in these queues until the output module concerned has available capacity. Moreover, the system does not permit fair distribution of the available output module capacity to the arriving ABR traffic.

The international patent application WO 94/14266 discloses a system in which input queues as well as output queues are provided in a network element for e.g. ATM traffic, and in which transfer of data packets from an input queue to an output queue is blocked when the filling degree of the output queue exceeds a threshold value. The output queues are hereby protected against overfilling which would result in loss of data. This system, however, is vitiated by the serious drawback that transfer of data packets from a given input queue to a given output queue can only be entirely allowed or entirely blocked, and moreover the system cannot distinguish between e.g. ABR traffic and ordinary traffic of higher priority. This is a problem, because it is exclusively the filling of an output queue which determines whether one or more of the input queues are closed. Thus, it is not possible to give the arriving data packets different priorities, and the system involves the risk that an output queue is filled with ABR packets and is therefore closed to more important traffic. Furthermore, the circumstance that transfer of data packets from an input queue to an output queue can only be entirely allowed or entirely blocked, means that the data processing in the network element will be uneven.

Further, the system is arranged so as to stop transfer of data to an output queue when the filling degree of said queue exceeds an established threshold value, e.g. when it is half full; but this means that it is not possible to utilize the capacity of the queue fully as it will always have a plurality of empty locations. The system must therefore be provided with excessively large output queues. The same applies to the input queues as these are attached to the incoming physical connections, and data packets to be distributed to several different output connections may arrive on one incoming connection. If an input queue is closed because the "first" data packet in the queue is for an overfilled output queue, also the subsequent data packets will be shut off even though these are for other output queues which are not over-filled. In addition to greater input queues, this means that other traffic of higher priority may be unduly delayed.

The international patent application WO 95/15637, which addresses a somewhat different problem, discloses attaching an input queue to each virtual connection in a network element in a teletransmission network. This allows for the situation just described, where data packets for an overfilled output queue shut off data packets for other output queues; but this does not remedy the other described problems.

Accordingly, an object of the invention is to provide a method of the type stated in the opening paragraph which has a simpler and more efficient internal traffic regulation, and which is capable of reducing the length of the buffers or queues used. Further, the method must permit a fair distribution of the available capacity.

This is achieved according to the invention in that the data packets transferred at a bit rate depending on available network capacity are transferred from the input queues to at least one output queue provided specifically for those packets at a bit rate which is regulated in several steps by a factor which depends on the filling degree of the output queue.

When the bit rate from the input queues to the output queue is regulated in several steps in dependence on the filling degree of the output queue, a more even filling of the output queue is obtained, since, usually, the transfer is not interrupted completely. As, when an output queue is nearly full, data packets are still transferred from the input queues, merely at a lower bit rate, it will still be possible to have different priority for the different input queues and thus maintain a fair distribution of the available capacity, as mentioned below. Furthermore, a relatively short output queue may be used, as the regulation ensures that the number of data packets in the queue will be substantially constant. Further, the system will always be ready to transmit ABR traffic when capacity becomes available, because it will not have to first fetch the data packets from the input queues.

When, several output queues are used and the bit rate is regulated separately for each output queue, it is moreover possible to allow for variations in available capacity between the individual outputs. Typically, an output queue is used for each outgoing line from the network element.

The most expedient regulation is provided when the said factor is relatively stable, and this is achieved by currently calculating the factor on the basis of the mean value of the filling degree during a preceding time span. This is in contrast to WO 94/14266 where, instead, sampling of the filling degree takes place each time a data packet is transferred, which results in a more unstable regulation.

A further improvement of the method is achieved by moreover regulating the bit rate by a factor indicative of a mutual weighting of the input queues. As mentioned, this ensures a more fair distribution of the capacity which is available, as the proportion between the transmission rates of a plurality of input queues supplying data to the same output queue constantly has a mutual proportion determined by the allocated weights. This mutual proportion is maintained unchanged when the overall capacity of an output queue is reduced by means of the first factor as a consequence of the queue being full.

When e.g. an ATM system is involved, the data packets or the cells are transmitted via a large number of virtual connections in the network, and then a particularly flexible regulation is achieved, by using an input queue for each virtual connection arriving at the network element concerned, because the individual virtual connections may then be weighted separately without considering whether they perhaps arrive at the network element on the same physical line. This takes place in that each input queue has its own weight factor.

In case of sudden changes in the data amount it may occur that the output queue becomes full, without the regulation factor having been able to regulate the bit rate from the input queues down, since, as mentioned, averaging is performed over a period of time. This is avoided by then interrupting the transfer of data packets from the input queues completely. Data losses are hereby avoided in this situation.

In an expedient embodiment of the invention, the transmission network is an ATM network, and the said data packets, transferred at a bit rate depending on available capacity in the network, are formed by ABR traffic.

As mentioned, the invention moreover concerns a network element for use in such a transmission network. When the element comprises an output queue specifically provided for packets transferred at a bit rate depending on available network capacity and means for regulating the bit rate in several steps depending on the filling degree of this queue, the advantages described above are achieved. The invention may concern expedient embodiments of the element corresponding to the matter described above.

Such a network element typically comprises a switching unit, a plurality of input modules and a plurality of output modules, and in that case it is expedient to position the input queues on the input modules, because the large number will result in an unduly complex control if the input queues are provided in the switching unit itself, as is usually the case.

The output queue or queues may be positioned in the switching unit or, when an output queue is provided for each output module, be positioned on these.

The invention will now be explained more fully below with reference to the drawing, in which.

Figure 1:
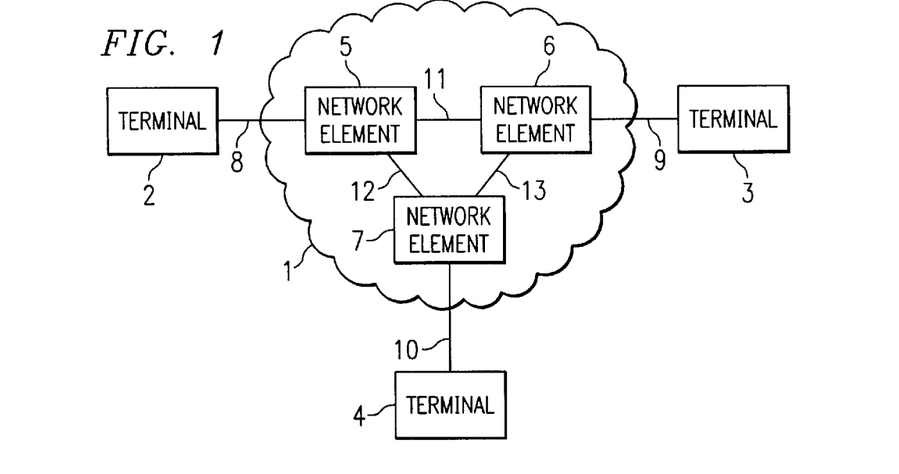
FIG. 1 shows a network element in which the invention may be applied.

FIG. 1 shows a simplified example of how an ATM network 1, in which the invention may be applied, may be designed. The network sets up connections between a plurality of ATM terminals 2–4 (users or ATM subscribers), and it consists of a plurality of network elements 5–7 as well as a plurality of transmission lines 8–13 which connect the terminals with the network elements and these with each other.

ATM is a packet technology transferring traffic between ATM terminals in short packets or cells, each of which is of 53 bytes, of which 48 bytes are used for information proper, while 5 bytes are used for so-called header information used inter alia for controlling the transmission. The physical transmission medium providing for the transmission of the data packets or the ATM cells along the transmission lines 8–13, may e.g. be optical fibres using PDH (Plesiochronous Digital Hierarchy) or SDH (Synchronous Digital Hierarchy), and the system may e.g. be used for wideband ISDN (Integrated Services Digital Network).

The task of the ATM network is thus just to transfer ATM cells from one point in the network to another, which, as mentioned, is controlled by the overhead information. The ATM traffic to be transferred by the network may have a constant or variable bit rate, and owing to the latter in particular the transmission takes place by means of virtual connections, which thus just occupy transmission capacity in relation to the amount of data transferred in reality. A virtual connection is set up by transmitting information from the transmission point to the network elements which have to be passed to arrive at the destination, concerning which way the elements are to transmit the ATM cells associated with the connection. These may be identified by means of their overhead information.

As mentioned, the network 1 in FIG. 1 is simplified, it being just shown with three network elements 5–7 which are interconnected by three transmission lines 11–13. In practice, an ATM network will be far more comprehensive and consist of a large number of network elements which are interconnected by a large number of transmission lines. It should be stressed that a large number of virtual connections may be transferred on each transmission line. In FIG. 1, e.g. a virtual connection from terminal 3 to terminal 4 will proceed along the transmission lines 9, 13 and 10 and en route pass the network elements 6 and 7.

Figure 2:
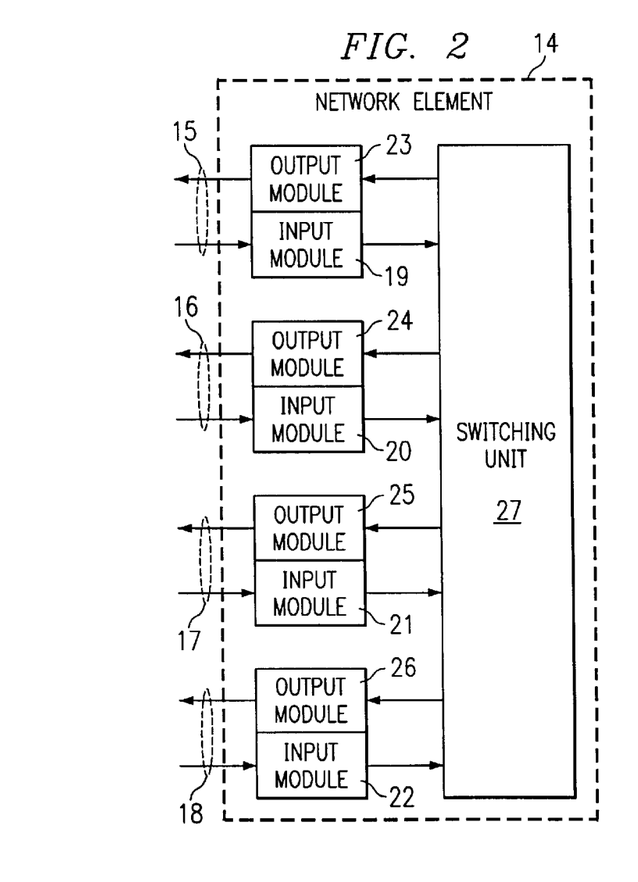
FIG. 2 shows a network element for use in the network of FIG. 1.

FIG. 2 shows a network element 14 which is connected to four transmission lines 15–18. ATM cells associated with a virtual connection may e.g. arrive at the network element 14 on the line 15, and the network element is then to decide on the basis of the overhead information of the cells on which line the cells are to be transmitted. As appears from the arrows on the transmission lines, these are bidirectional. Accordingly, an input module 19–22 and an output module 23–26 are provided for each line. The actual switching and the control thereof take place in the switching unit 27.

The described structure of a network and a network element, respectively, is the same, no matter whether ABR traffic occurs in the network or not. ABR traffic is traffic which is insensitive to delays in the transmission, i.e. traffic where it is without importance when it arrives at the destination, as long as it arrives safely. Typically, this traffic is buffered or queued in the input modules of the network elements until capacity is available on the relevant output line, and then it is transmitted and hereby utilizes surplus capacity in the network. Examples of applications capable of utilizing ABR are file transfers, electronic mail, distributed computation power, interactive services, etc.

The rest of the traffic, here called non-ABR traffic, must have priority over the ABR traffic, as, otherwise, the ABR traffic might occupy the entire capacity. Existing priority levels in the non-ABR traffic are not affected by whether ABR traffic occurs or not.

Figure 3:
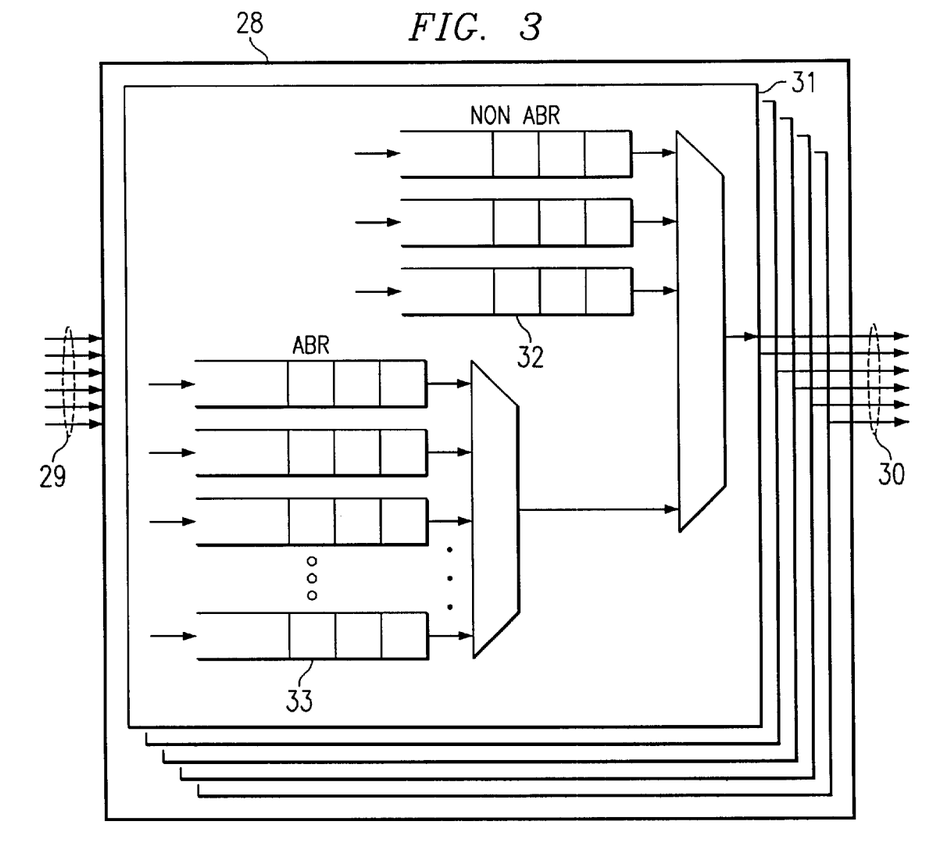
FIG. 3 shows an example of an embodiment of a network element.

FIG. 3 shows a general network element 28 intended to handle non-ABR traffic as well as ABR traffic according to the invention. The element has a plurality of ingoing lines 29 and a plurality of outgoing lines 30. As described before, the ingoing and the outgoing lines will usually be associated in pairs corresponding to the physical transmission lines. Each of the outgoing lines 30 has an associated queue module 31 in which ATM cells (both ABR and non-ABR) to be transmitted along the output line concerned are temporarily queued. As will be seen, a plurality of queues 32 is provided for the non-ABR traffic and a plurality of queues 33 is provided for the ABR traffic. In the prior art, there is usually one ABR queue for each outgoing line, but, as will be seen, a plurality of ABR queues is provided here on each queue module. The reason is that one input queue is used here for each virtual connection which passes the network element 28. The number of queues will thus vary with the number of virtual connections set up, and typically there will be many queues for each outgoing line.

Figure 4:
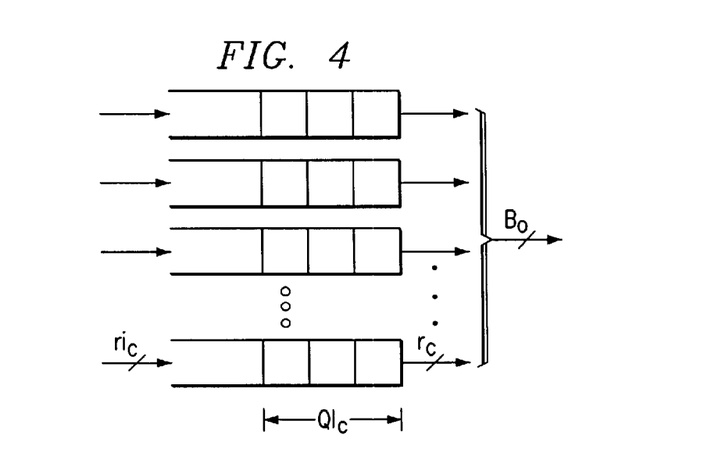
FIG. 4 shows a model of ABR queues in the element of FIG. 3.

FIG. 4 shows a simple model of how the ABR queues can operate. The transmission rate $r_c$ of the queue belonging to the virtual connection c, is given by:

$$r_c = \begin{cases} \min\{W_c \cdot \lambda, ri_c\}, & \text{if } Ql_c = 0 \\ W_c \cdot \lambda, & \text{if } Ql_c > 0 \end{cases} \qquad (1)$$

wherein $ri_c$ is the incoming cell rate of the connection c, $W_c$ is the relative weight of the connection c, $Ql_c$ is the length of the virtual queue for the connection c, and $\lambda$ is a value selected such that $$B_o \geq \Sigma r_c, \qquad (2)$$

where $B_o$ is the available rate of the output line o. If the formula (2) is satisfied for infinitely high values of $\lambda$, the virtual queues are empty, and the formula (1) is reduced to $r_c = ri_c$. An ABR connection may be in three states, active when $Ql_c > 0$, inactive when $r_c = 0$, and a transitory state when $Ql_c = 0$ and $ri_c > 0$. The transitory state occurs when cells begin arriving at an empty queue, and this situation is without importance for the following.

It will be seen from the formula (1) that when cells are present in one of the queues (the associated connection is active, i.e. $Ql_c > 0$), the transmission rate from this queue is given by the expression $W_c \cdot \lambda$, and it appears from the formula (2) that $\lambda$ is a factor ensuring that the total transmission rate from the queues transferring cells to a given output line does not exceed its available rate $B_o$, which varies in response to the non-ABR traffic. When the capacity available for ABR on an output line is reduced, $\lambda$ will thus have to be reduced for this output line so that fewer cells are transferred from the connected queues. The transmission rate of all queues associated with a specific output is thus reduced by the same factor. It will be described more fully below how $\lambda$ may be derived. The weight factor $W_c$, on the other hand, is determined individually for each virtual connection and thus for each input queue and indicates the proportion between the transmission rates of the individual queues. The combination of the two factors ensures a fair distribution of the available capacity, as the mutual proportion determined by $W_c$ is maintained unchanged, also when the total transmission rate to a given output line is regulated up or down by means of the factor $\lambda$.

In FIG. 3, the input queues 33 associated with the virtual connections are arranged on queue modules 31, there being one queue module for each outgoing line. The queue modules are therefore positioned in the switching unit 27 itself (FIG. 2) or optionally with one queue module positioned in each output module. This solution, however, may be very complex, as the number of queues will be very large and the control functions therefore extremely complicated. It will therefore be expedient to place the input queues in the input modules instead, as each input module then has queues for the virtual connections entering the associated input line.

Figure 5:
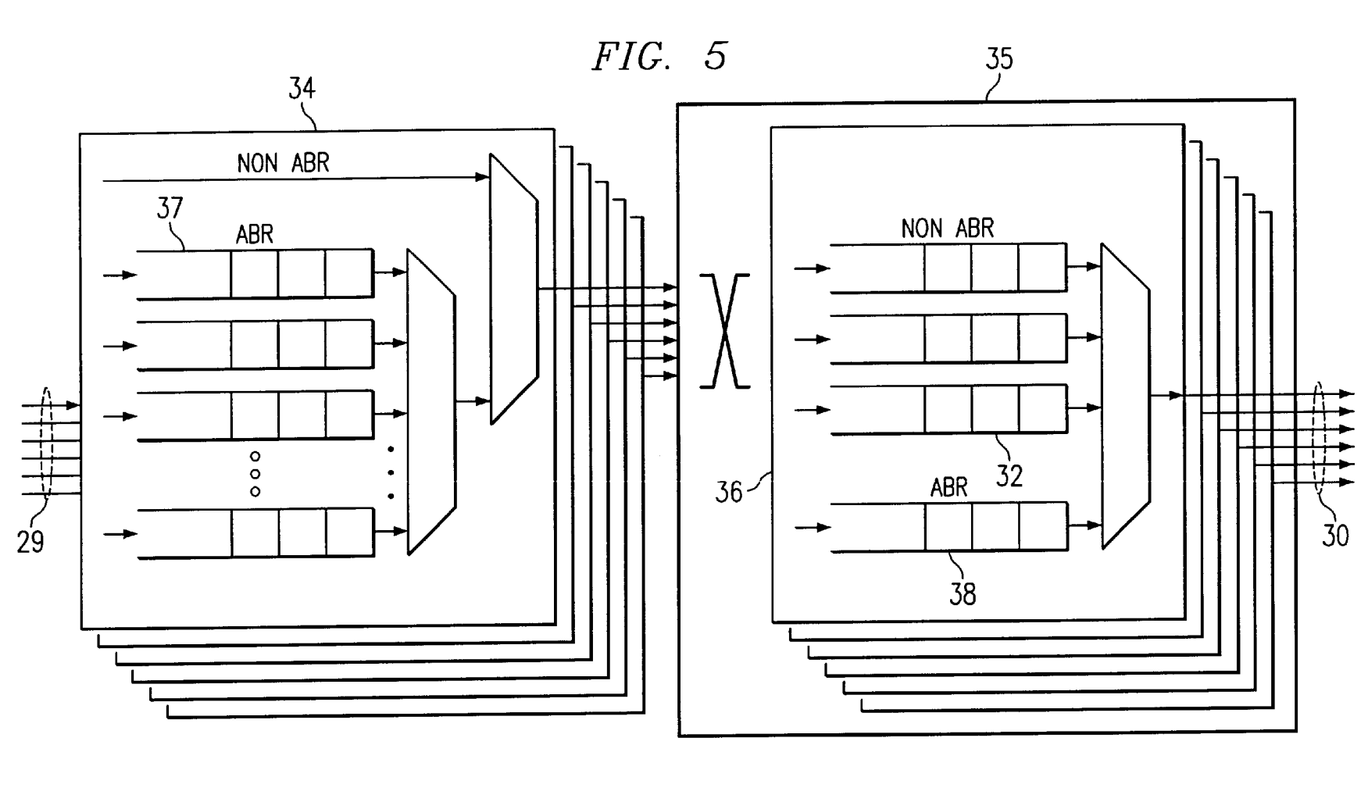
FIG. 5 shows an embodiment of a network element according to the invention.

This is shown in FIG. 5. The ingoing lines 29 and the outgoing lines 30 correspond to FIG. 3. Here, the network element has a plurality of input modules (corresponding to the plurality of ingoing lines), of which the input module 34 is shown. As will be known from FIG. 2, these are connected to the switching unit 35 which has a plurality of queue modules 36 corresponding to the plurality of outgoing lines. The non-ABR traffic is processed entirely like in FIG. 3, but, as shown, now just passes through the input modules to the queues 32 on the queue module. For the ABR traffic, on the other hand, there is now a plurality of input queues 37 on each input module 34, said plurality corresponding to the plurality of virtual connections, as mentioned, which enter the associated input line. Now just one ABR queue 38 for each output line is present on the queue modules 36, and this queue, which is called the output queue, collects ABR cells to the output originating from the input queues whose virtual connection is to be fed to the output concerned. As will be described more fully below, the plurality of cells queued in this queue may be utilized for deriving the factor λ in that, if the queue is being filled, λ is reduced, thereby down-regulating the rate at which the cells are transferred from the input queues to the output queue.

The necessary size of the input queues, each of which corresponds to a virtual ABR connection, as mentioned, will frequently be of e.g. 1,000–50,000 cells, and, as mentioned, these queues should be implemented on the input modules rather than in the switching unit, as the requirement with respect to the rate of the storage implementing the queues is 2R on the input modules and R(N+1) in the switching unit, where R is the bit rate and N is the number of output ports on the switching unit. When the input queues are positioned on the input modules, the size of the ABR queue in the switching unit will be limited to e.g. 200–500 cells. The feedback from the switching unit to the input units (i.e. λ) is to ensure that the queues positioned in the switching unit will neither overflow nor be emptied, if ABR cells are queued for a given output on one of the input modules.

Figure 6:
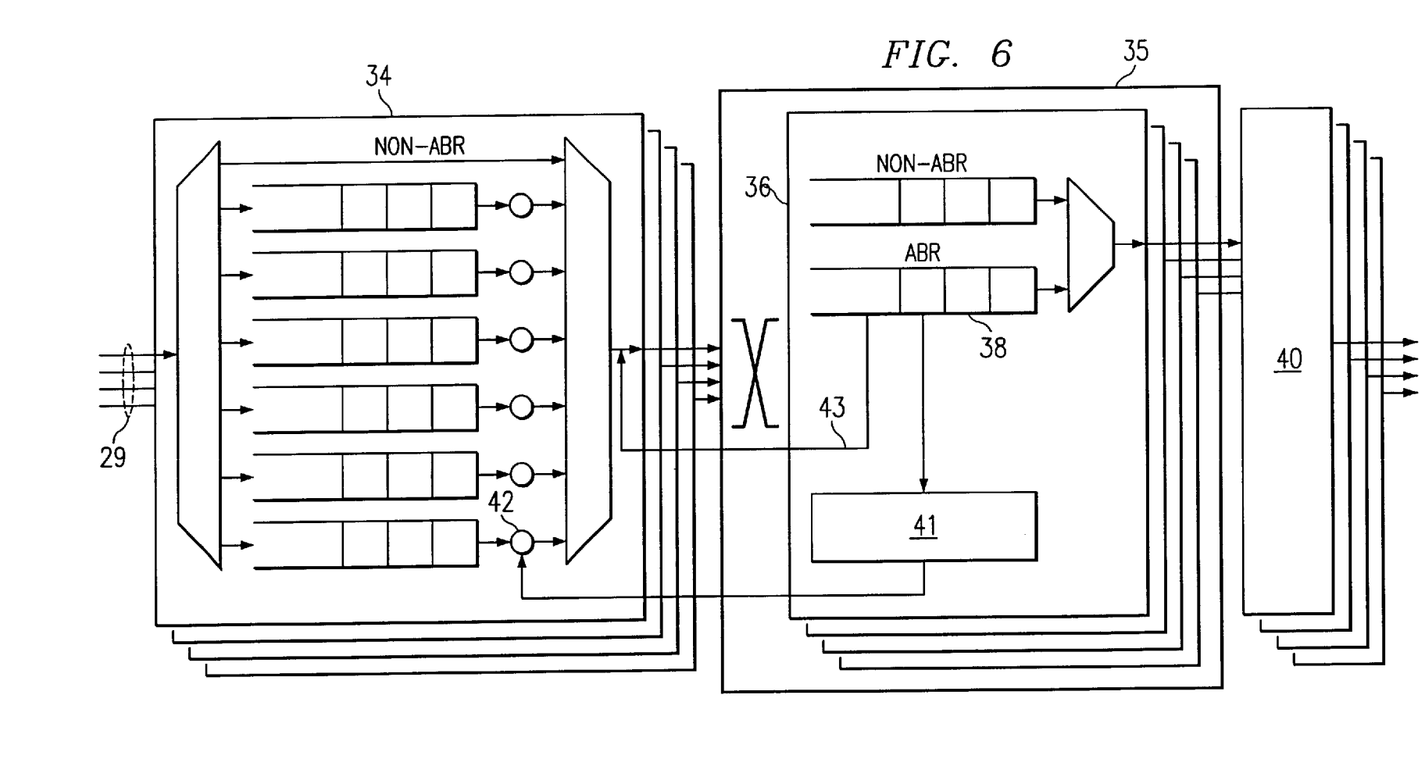
FIG. 6 shows feedback in the element of FIG. 5.

The feedback information consists of a soft and a hard feedback. The soft feedback (λ) ensures fairness between the ABR connections and regulates the ABR traffic from the input modules. The hard feedback prevents cell losses, if the ABR buffer in the switching unit should be filled-up completely. All input modules supplying cells to a given output queue receive the same hard and soft feedback. The feedback information is shown in FIG. 6, which corresponds to FIG. 5. The input modules 34 and the switching unit 35 with the queue modules 36 are the same, and also the output modules 40 are shown. In the calculating circuit 41, the switching unit calculates the value of λ for the output concerned by using the length of the relevant ABR queue 38. The λ values are transferred as shown from the calculating circuit 41 to a plurality of traffic adaptation circuits 42 in the input module 34 and thus constitute the soft feedback. The feedback is just shown to one of the traffic adaptation circuits 42 in the figure, but takes place of course to all the circuits which are suppliers to the output queue 38. Each λ value (i.e. for each output) is transferred each time $T_{update}$ periods have elapsed, and the soft feed-back thus on average transfers $N/T_{update}$ values of λ in each cell period, where N is the number of output ports on the switching unit. When the adaptation functions 42 need to know the instantaneous permitted rate of a given connection, the rate is calculated on the basis of the λ value of that connection received last.

The actual calculation of λ in the circuit 41 is quite complicated if the calculation is to be accurate, and accordingly an approximated method is used, which appears from the below formula for the calculation of $\lambda_{o,t}$, i.e. λ for the output line o at the time t. As mentioned above, and to save calculation power, $\lambda_{o,t}$ is only calculated each time $T_{update}$ periods have elapsed. As the expression n↑m for two integers n and m is defined as (m mod n)=0, $\lambda_{o,t}$ is given by:

$$\lambda_{o,t} = \begin{cases} f(\lambda_{o,t-T_{update}}, Ql_{o,t}, Ql_{o,t-T_{update}}), & t > 0 \wedge T_{update} \uparrow t \\ \lambda_{o,t-1}, & \neg (T_{update} \uparrow t) \\ 0, & t = 0 \end{cases} \quad (3)$$

An example of a simple algorithm f( ) for a control loop to calculate $\lambda_{o,t}$ is:

$$f(\lambda_{old}, Ql, Ql_{old}) = \max\{\lambda_{old} - F_a \cdot (Ql - Ql_{old}) - F_b \cdot (Ql - Ml), 0\}, \quad (4)$$

where
  t is the time in cell periods in the switching unit
  $Ql_{o,t}$ is the queue length of the output queue of port o at time t
  Ml is the queue length in an imaginary stable state with 100% utilization of $B_o$,
  $F_a$ and $F_b$ are constants, and
  $T_{update}$ is the calculation frequency of λ (number of cell periods).

The hard feedback 43 contains information on full ABR queues in the switching unit. When an input module detects a full ABR queue in the switching unit, it stops transmitting cells which are to be transferred to that queue. It should be noted that the hard feedback just prevents cell loss in the switching unit, but does not guarantee fairness. If the soft feedback and the adaptation function 42 were ideal, the hard feedback would not be necessary. The hard feedback 43 is used when the soft feedback cannot reduce the cell rates from the input modules fast enough.

The overall system ensures that no empty cells are transmitted to a given port, if cells are queued for that port somewhere in the system. However, this does not apply if the ABR queue for a given output port in the switching unit is empty, while ABR cells are queued for that port in the input queues. This situation occurs when the soft feedback cannot increase λ fast enough.

In general, the ATM network elements may be provided with both input modules capable of handling ABR according to the invention, and modules not capable of handling ABR. In that case, the actual switching unit must be adapted for ABR and be capable of supplying the hard and the soft feedback, and, of course, ABR connection can only be set up between input and output modules which are capable of handling ABR.

Figure 7:
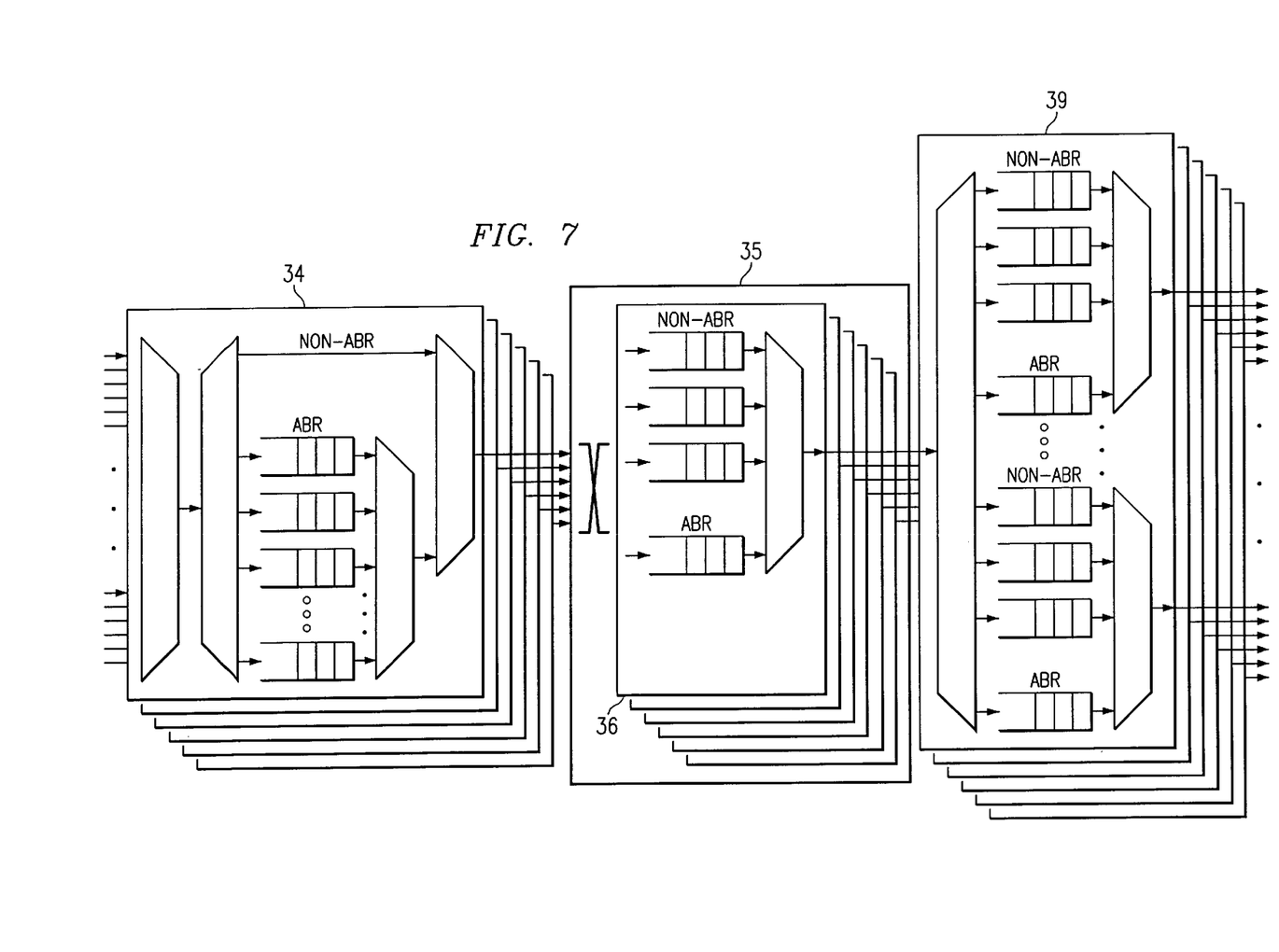
FIG. 7 shows another embodiment of a network element according to the invention.

An alternative to the solution shown in FIGS. 5 and 6 is shown in FIG. 7, where queues are also positioned on the output modules. The input modules 34 and the switching unit 35 with the queue modules 36 are the same as in FIG. 5. In addition, queues are positioned on the output modules 39. This is also called submultiplexing, and the queues on the output modules are called submultiplexing queues. The queue structure is the same on the output modules 39 as in the switching unit 35, as the output queues have merely been moved from the switching unit to the output modules. The queues in the switching unit are now used for rate adaptation from the many input modules to an output module.

Figure 8:
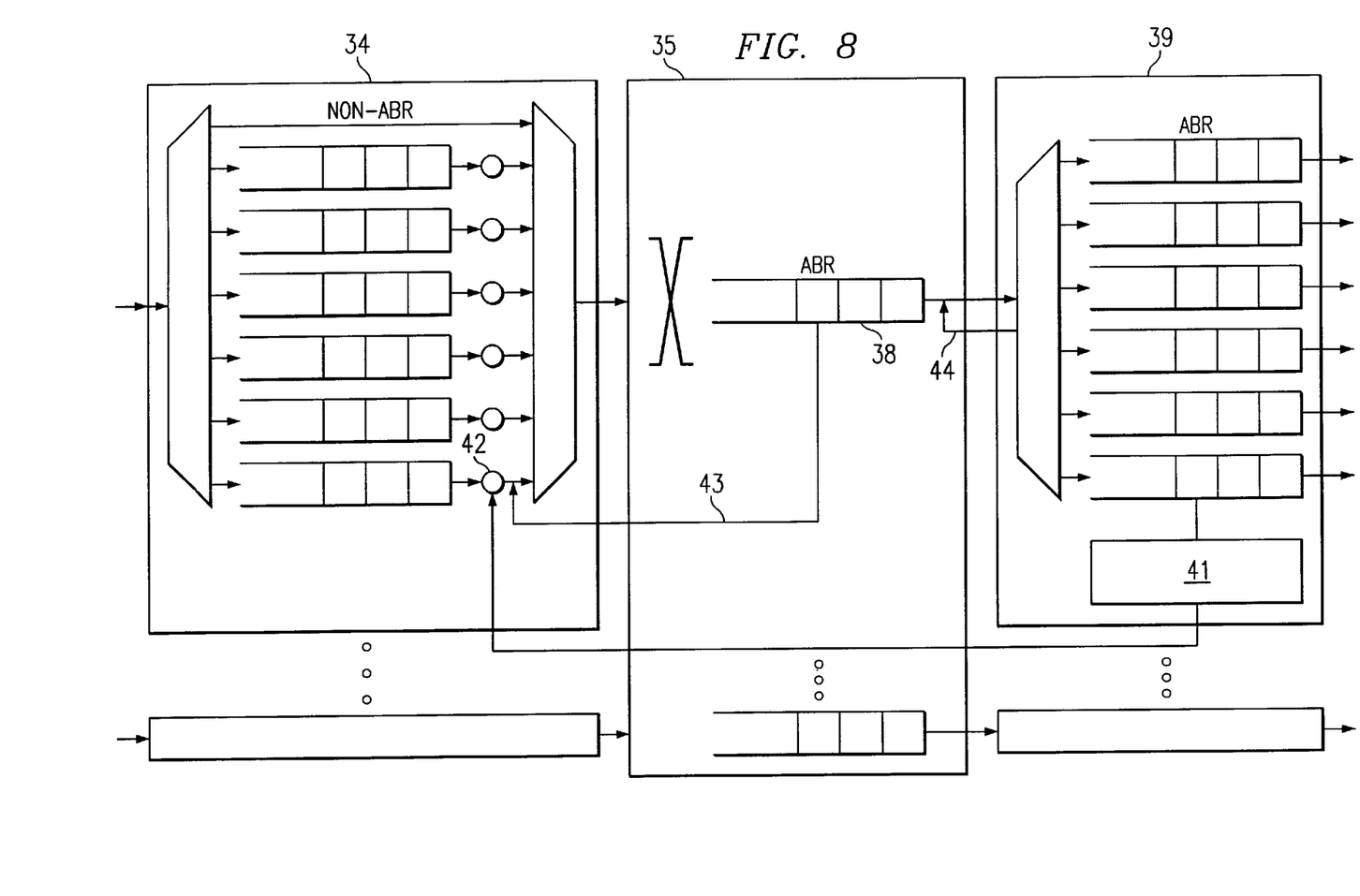
FIG. 8 shows feedback in the element of FIG. 7.

FIG. 8 shows the hard and the soft feedback in this situation. The ABR queues which here constitute the "bottleneck" with respect to the determination of the λ value, are the queues on the output modules 39, and the circuit 41 is therefore provided here, and, like before, the soft feedback is fed from there to the adaptation circuit 42 in the input module 34. The calculation of λ can take place in the same manner as described before.

The risk of an ABR queue in the switching unit becoming full is the same as in FIG. 6, and the hard feedback 43 is therefore still necessary to prevent cell loss in the switching unit. The function of the hard feedback is therefore unchanged.

Because of the submultiplexing used, the buffers on the output modules will be greater than those in the switching unit, and since the cell rate to the output module is therefore lower than in the switching unit on average, the probability of the ABR queues in the output module becoming full is reduced. If this should happen nevertheless, the feedback 44 will stop all cells to the output module, i.e. also to the other ABR queues, even though these are perhaps not full. This is acceptable, since the ABR queues on the output modules will only rarely be full, as mentioned.

Although a preferred embodiment of the present invention has been described and illustrated, the invention is not restricted to this, but may be also be embodied in other ways within the scope of the subject-matter defined in the following claims.

What is claimed is:

1. A method of transferring data packets between a plurality of network elements in a teletransmission network, comprising:

transferring at least some data packets at a bit rate which depends on available network capacity;

positioning the at least some data packets, when arriving at a network element, in a plurality of input queues;

transferring said at least some data packets from the input queues to at least one output queue provided specifically for said at least some packets at a bit rate which is regulated in several steps by a first factor which depends on the filling degree of said at least one output queue;

completely interrupting transfer of said at least some data packets from the input queues to said at least one output queue independent of said regulation of the bit rate in response to the at least one output queue reaching its full capacity.

2. A method according to claim 1, characterized in that several output queues are provided specifically for said at least some packets, and that the data packets from each input queue are transferred to one of the output queues at a bit rate which is regulated by said first factor which depends on the filling degree of said one output queue.

3. A method according to claim 1, characterized in that the transmission network is an asynchronous transfer mode network, and that said data packets, transferred at a bit rate depending on available network capacity, are formed by available bit rate traffic.

4. method of transferring data packets between a plurality of network elements in a teletransmission network, comprising:

transferring at least some data packets at a bit rate which depends on available network capacity;

positioning packets, when arriving at a network element, in a plurality of input queues;

transferring said at least some data packets from the input queues to at least one output queue provided specifically for said at least some packets at a bit rate which is regulated in several steps by a first factor which depends on the filling degree of said at least one output queue;

characterized in that said first factor for the at least one output queue is currently calculated on the basis of the mean value of the filling degree of the at least one output queue during a preceding time span.

5. A method of transferring data packets between a plurality of network elements in a teletransmission network, comprising:

transferring at least some data packets at a bit rate which depends on available network capacity;

positioning packets, when arriving at a network element, in a plurality of input queues;

transferring said at least some data packets from the input queues to at least one output queue provided specifically for said at least some packets at a bit rate which is regulated in several steps by a first factor which depends on the filling degree of said at least one output queue;

characterized in that the bit rate, at which said at least some data packets are transferred from the input queues to the at least one output queue is moreover regulated by a second factor which is indicative of a mutual weighting of the input queues.

6. A method according to claim 5, wherein the data packtes are transferred via a plurality of virtual connections set up in the network, characterized in that an input queue is allocated to each virtual connection which passes the network element concerned.

7. A method according to claim 6, characterized in that said another second factor for each input queue is a predetermined weight factor for the connection associated with the input queue with respect to the other connections which are set up in the network.

8. A network element for use in a teletransmission network, wherein data packets are transferred between a plurality of network elements at a bit rate which depends on available network capacity, said network element comprising;

a plurality of input queues in which data packets, when arriving at a network element, are positioned;

one or more output queues to which the data packets may be transferred from the input queues; and means for transferring the data packets from the input queues to the one or more output queues, characterized in that at least one particular output queue is provided specifically for said at least some data packets and that said means are arranged to transfer said at least some data packets to said at least one particular output queue at a bit rate which may be regulated in several steps by a first factor which depends on the filling degree of said at least one particular output queue;

means for completely interrupting the transfer of data packets from the input queues to said at least one particular output queue independent of said regulation of the bit rate if said at least one particular output queue concerned is full.

9. A network element according to claim 8, characterized in that it is adapted for use in an asynchronous transfer mode network, wherein said data packets, transferred at a bit rate depending on the available network capacity, are formed by available bit rate traffic.

10. A network element for use in a teletransmission network, wherein data packets are transferred between a plurality of network elements at a bit rate which depends on available network capacity, said network element comprising:

a plurality of input queues in which data packets, when arriving at a network element, are positioned;

one or more output queues to which the data packets may be transferred from the input queues; and means for transferring the data packets from the input queues to the one or more output queues, characterized in that at least one particular output queue is provided specifically for at least some data packets and that said means are arranged to transfer said at least some data packets to said at least one particular output queue at a bit rate which may be regulated in several steps by a first factor which depends on the filling degree of said at least one particular output queue, characterized in that each input queue corresponds to a virtual connection in the network.

11. A network element for use in a teletransmission network, wherein data packets are transferred between a plurality of network elements at a bit rate which depends on available network capacity, said network element comprising:

a plurality of input queues in which data packets, when arriving at a network element, are positioned;

one or more output queues to which the data packets may be transferred from the input queues; and means for transferring the data packets from the input queues to the one or more output queues, characterized in that at least one particular output queue is provided specifically for at least some data packets and that said means are arranged to transfer said at least some data packets to said at least one particular output queue at a bit rate which may be regulated in several steps by a first factor which depends on the filling degree of said at least one particular output queue, characterized in that it moreover comprises means for regulating the bit rate, at which the data packets are transferred from the input queues to the output queue, by a second factor which is indicative of a mutual weighting of the input queues.

12. A network element for use in a teletransmission network, wherein data packets are transferred between a plurality of network elements at a bit rate which depends on available network capacity, said network element comprising:

a plurality of input queues in which data packets, when arriving at a network element, are positioned;

one or more output queues to which the packets may be transferred from the input queues; and means for transferring the data packets from the input queues to the one or more output queues, characterized in that at least one particular output queue is provided specifically for at least some data packets and that said means are arranged to transfer said at least some data packets to said at least one particular output queue at a bit rate which may be regulated in several steps by a first factor which depends on the filling degree of said at least one particular output queue, said network element including a switching unit, a plurality of input modules, and a plurality of output modules, characterized in that said input queues are positioned on the output modules.

13. A network element according to claim 12, characterized in that said at least one particular output queue is positioned in the switching unit.

14. A network element according to claim 12, characterized by a plurality of output queues which at least corresponds to the plurality of output modules, said plurality of output queues being positioned with at least one output queue on each output module.

* * * * *

UNITED STATES PATENT AND TRADEMARK OFFICE
CERTIFICATE OF CORRECTION

PATENT NO.    : 6,529,476 B1
DATED         : March 4, 2003
INVENTOR(S)   : Andreas Magnussen It is certified that error appears in the above-identified patent and that said Letters Patent is hereby corrected as shown below:

<u>Title page, Item [54], and Column 1, line 4,</u>
Title, please insert the heading -- TECHNICAL FIELD OF THE INVENTION --
Item [56], References Cited, OTHER PUBLICATIONS, second listed reference, please delete "Switvh" and insert -- Switch --; third listed reference, please delete "Selay" and insert -- Delay --.
Item [57], ABSTRACT, at the end of paragraph after "queue", please insert the following paragraph,
-- A network element (14; 28) for use in such a teletransmission network (1) comprises a plurality of input queues (33; 37) in which data packets are positioned when they arrive at a network element. The network element moreover comprises at least one output, queue (38) to which the packets may be transferred from the input queues (33; 37), and means for transferring the packets from the input queues (33; 37) to the output queue (38) at a bit rate which may be regulated by a factor ($\lambda$) which depends on the filling degree of the output queue.

<u>Column 1,</u>
Line 13, prior to the beginning of the text paragraph, please insert the heading -- BACKGROUND OF THE INVENTION --.

<u>Column 3,</u>
Line 1, before the beginning of the pararagraph, please insert the heading --.
SUMMARY OF THE INVENTION --.
Line 28, after "when" delete ",".
Line 53, after "achieved" delete ",".

<u>Column 4,</u>
Line 2, prior to the beginning of the next parapraph, please insert the heading
-- BRIEF DESCRIPTION OF THE DRAWINGS --.
Line 38, prior to the beginning of the next paragraphs, please insert the heading
-- DETAILED DESCRIPTION OF THE DRAWINGS --.

UNITED STATES PATENT AND TRADEMARK OFFICE
CERTIFICATE OF CORRECTION

PATENT NO. : 6,529,476 B1
DATED : March 4, 2003
INVENTOR(S) : Andreas Magnussen

It is certified that error appears in the above-identified patent and that said Letters Patent is hereby corrected as shown below:

Column 5,
Line 47, after "lines" delete "29" and insert -- 28 --.

Signed and Sealed this

Twenty-second Day of March, 2005

JON W. DUDAS
*Director of the United States Patent and Trademark Office*